Figures 1, 2:
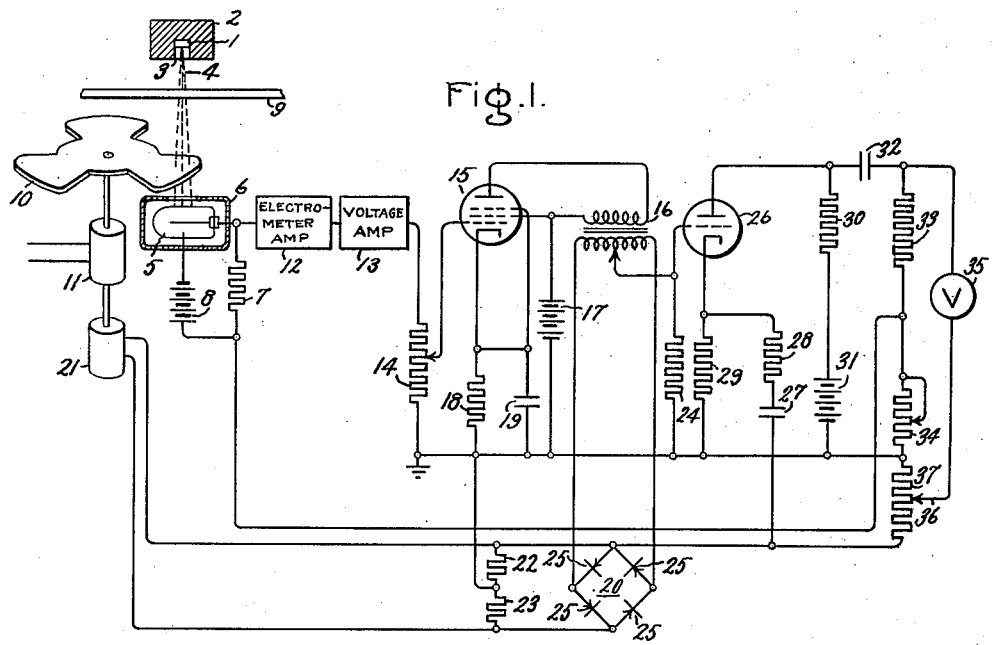

Aug. 8, 1950

S. BERNSTEIN 2,518,115

AMPLIFICATION SYSTEM FOR NONCONTACTING
THICKNESS GAUGES

Filed March 10, 1949

Inventor:
Stanley Bernstein,
by Richard E. Haley
His Attorney.

Patented Aug. 8, 1950

2,518,115

UNITED STATES PATENT OFFICE 2,518,115

AMPLIFICATION SYSTEM FOR NONCONTACTING THICKNESS GAUGES

Stanley Bernstein, Schenectady, N. Y., assignor to General Electric Company, a corporation of New York Application March 10, 1949, Serial No. 80,716

4 Claims. (Cl. 250—83.6)

My invention relates to precision thickness gauges of the type employing radiations, such as beta rays, emitted from a radioactive source as the measuring agent.

In general, a thickness gauge of the above type comprehends a source of subatomic particles, such as beta rays, a suitable detector of the radiations emitted from this radioactive source, and means to measure the amount of such radiations reaching the detector when a material, the thickness of which is to be measured, is interposed between the source and the detector. In order to permit utilization of an alternating current amplification system and to minimize background radiations which may cause spurious responses in the above type detector, it has been suggested that a rotary shutter periodically interrupt and thereby modulate the radiation beam, so that the output of the detector will have a modulation frequency alternating component which can then be independently amplified and measured. Due to the extremely large amplification that is necessary in order that the changes in detector output be perceptible, one important source of error in a system of this type is the amplification system itself.

A principal object of my invention, therefore, is to provide a circuit for the above type thickness gauge whereby errors introduced by an associated amplifier, such as by variations in the gain thereof, are appreciably reduced.

One extremely accurate system which has been devised heretofore to minimize this amplification error utilizes a null deflection system in which a bucking voltage is balanced against the output of the detector until the consequent error voltage, as amplified and indicated on a suitable meter, is zero. The amount of bucking voltage that is introduced to obtain this null deflection point is calibrated to indicate the actual thickness of the material which is measured. It will be appreciated, however, that in a system of this type the meter is used only as a balance indicator, and that a new setting of the bucking voltage is required each time a material of different thickness is measured. It will also be appreciated that amplification error is minimized only at the null deflection point and that the deflection of the meter throughout its range does not accurately represent the deviation in thickness of various specimens or portions of a particular specimen.

A further object of my invention, therefore, is to provide a measurement circuit in which the deflections of a meter represent with great accuracy the deviation in the thickness of various specimens and can be calibrated to read directly the thickness thereof.

Because of the necessity of multiple stages of amplification in such thickness gauges, other circuits, such as conventional feedback circuits, which have been suggested to reduce amplification errors have generally sacrificed the stability characteristics of the amplifier if a large amount of feedback is used in order to achieve greater accuracy. A further specific object of my invention, therefore, is to provide a new and improved feedback circuit for an amplification system employed in a thickness gauge of the radiation beam modulated type which effectively minimizes amplification errors and yet has good stability.

Broadly stated, my invention comprehends an amplifier for a radiation beam modulated type of non-contacting thickness gauge in which the amplified alternating component of the output of an associated radiation detector is converted into a representative unidirectional voltage which is combined through a variable transconductance amplifier with an alternating voltage of the same frequency as that of the modulated radiation detector voltage but in phase opposition thereto. A fraction of this combined voltage is then fed back to the input of the amplifier in order to compensate for any change in gain due to amplification. A meter, which may be calibrated to read directly the thickness of a material intercepting the radiation beam, is preferably connected in the circuit at a point of low inherent amplification error and measures a voltage proportional to the feedback voltage. Means are also included in the circuit whereby the meter may be adjusted to read a change from any desired setting in order to permit the instrument to be used over a limited range or, conversely, to extend the useful range of measurement of any particular instrument.

The novel features which I believe to be characteristic of my invention are set forth with particularity in the appended claims. My invention itself, however, can best be understood by reference to the following description taken in connection with the accompanying drawing in which Fig. 1 is a circuit diagram of a thickness gauge embodying my invention and Fig. 2 is a curve explanatory of the operation of the variable transconductance amplifier included in the circuit of Fig. 1.

Referring to Fig. 1, I have shown my invention in one form as including a radioactive source 1 of subatomic particles, such as beta rays, enclosed within a shield 2, preferably lead, which has a small window 3 on one side through which radiations are emitted in the form of a beam 4. Although I prefer to use beta rays because their moderate range in the neighborhood of several feet of air or .100 inch of aluminum is particularly suitable for many industrial applications, many other types of subatomic particles such as alpha particles, protons, or neutrons, may alternatively be used, depending upon the thickness and composition of the material to be measured and the availability of a suitable radioactive source. Sources of beta particles are relatively easy to obtain. They are emitted, for example, from radium, strontium 90, carbon 14 and caesium 134.

A radiation detector sensitive to subatomic particles, such as an ionization chamber 5, is arranged to receive the beam of beta rays 4 emitted from source 1. This ionization chamber 5 is also preferably enclosed within a shield 6 to minimize spurious electrostatic pick-up. A resistor 7 and a suitable high voltage source 8 are connected to form a series circuit with the ionization chamber 5. As is well known in the art, the ionization chamber 5 functions as a variable impedance controlled by the number and rate of arrival of the ionizing particles and causes a voltage to appear across the resistor 7 which represents the intensity of the radiation beam 4. When a material 9 to be measured intercepts the beam 4, the beta rays are absorbed to a degree depending upon the thickness of the material 9; and the unabsorbed rays reaching detector 5 produce a voltage across resistor 7 which is a measure of the thickness of the material 9.

In order to produce an alternating signal voltage and to minimize the effect of spurious voltages which may appear across resistor 7 due to background radiations, a rotary shutter 10 driven by a motor 11 is provided to interrupt periodically and thereby to modulate the beam of beta rays. The background radiations which produce these spurious voltages are principally of the type having great penetrating power and undergo relatively little attenuation due to the shutter 10. Background radiations of the less penetrating type are effectively absorbed by the shields 2 and 6. Therefore, the modulation frequency alternating component of the voltage across resistor 7 accurately represents the thickness of an interposed material 9.

The system for minimizing the effects of background radiation and producing an alternating signal component described above is substantially identical to the system described and claimed in patent application, Serial Number 33,945, now Patent Number 2,488,269, filed by C. W. Clapp on June 19, 1948. As previously explained, my present invention is directed towards the provision of a convenient circuit by which the alternating voltage component generated by the radiation detector in such a system may be highly amplified and accurately measured.

The alternating signal voltage appearing across resistor 7 is first applied to an electrometer amplifier designated by block 12, which is preferably of the vacuum tube type, operated with a low plate voltage in order to reduce tube noise and grid current. This amplified voltage is applied to a voltage amplifier such as a conventional vacuum tube amplifier designated as block 13. The amplified voltage output appearing across a potentiometer 14 is then applied to the controlling electrode of a vacuum tube 15 connected as a conventional power amplifier to produce an alternating current through an output transformer 16 responsive to the signal voltage. A voltage source 17, a cathode resistor 18 and a bypass capacitor 19 provide the proper operating potentials for this power amplifier. It will be understood, of course, that although I have indicated only two stages of voltage amplification between the signal voltage and the power amplifier 15, additional stages may be included, if necessary.

In order to convert the alternating signal voltage developed across transformer 16 into a corresponding unidirectional voltage, I provide a phase sensitive detector, preferably in the form of a ring rectifier 20 in which one pair of diagonally opposite corners are connected across the secondary of transformer 16 while the other pair of diagonally opposite corners are connected across the output winding of an alternator 21. This alternator 21 is driven in synchronism with shutter 10 by motor 11, but produces an alternating output voltage which is adjusted to be 180° out of phase with the voltage developed across resistor 7. Equal resistors 22 and 23 are connected as a voltage dividing circuit across the output winding of alternator 21 to permit a center tapped connection which may be grounded as indicated. A resistor 24 is connected between a center tap on the secondary of transformer 16 and ground. Since the frequency of the output of the alternator is equal to the signal frequency, the ring rectifier 20 functions in a well known manner to cause a unidirectional current to flow through resistor 24, whose magnitude and direction represent the amplitude and phase of the signal voltage. The rectifier elements 25 of the ring rectifier 20 are arranged to cause the unidirectional voltage developed across resistor 24 and applied to the grid of a variable transconductance amplifier tube 26 to become more positive as the amplitude of the alternating signal voltage increases and, conversely, to become less positive as the signal level decreases.

In order to provide a synchronized alternating current input for the variable transconductance amplifier 26, the voltage developed by one half of the alternator output winding is connected through a series capacitor 27 and a voltage dropping resistor 28 across a cathode resistor 29. A load resistor 30 and a voltage source such as battery 31 complete the anode to cathode circuit of tube 26.

For the proper operation of this variable transconductance amplifier, it is necessary that the transconductance of the tube 26 vary together with its operating level. This may be easily accomplished by using a relatively high voltage source and an alternating current load whose magnitude is much smaller than the plate resistance of the tube. Typical values of this stage are 1000 ohms for the alternating current load, 200 ohms for cathode resistor 29 and 300 volts for battery 31. As indicated by the typical grid voltage-plate current curve of this variable transconductance amplifier illustrated in Fig. 2, the rate of change of plate current $i_p$ with respect to grid voltage $e_g$ at the lower end of the curve is much smaller than the rate of change at the upper end. Therefore, for a given magnitude of alternating reference voltage, $e_r$, applied between the grid and cathode of tube 26, the plate current and consequent amplification of the stage varies directly as the change in the direct current operating level of the tube. In the instant embodiment, this change in operating level is dependent upon the change in the unidirectional voltage developed across resistor 24.

The output of the variable transconductance amplifier 26 is applied through a coupling condenser 32 across a voltage dividing network such as resistors 33, and 34. Resistor 34 is preferably variable, as indicated. A fraction of this output voltage, depending upon the relative magnitudes of resistors 33 and 34, is fed back to input of the electrometer amplifier 12 as illustrated. Since the alternating voltage applied to the cathode of tube 26 is 180° out of phase with the voltage developed across resistor 7 by the action of ionization chamber 5, the output voltage of the variable amplifier and consequently the fraction of this output voltage which is fed back to the input of amplifier 12, is also always 180° out of phase with the original signal voltage.

An alternating current voltmeter 35, which preferably is phase sensitive, is connected between the high voltage end of resistor 33 and the movable arm 36 of a potentiometer 37; which, in turn, is connected across one half of the output winding of the alternator 21. Since the same half of the output winding of the alternator 21 is employed as the alternating reference voltage for tube 26, and since the voltage developed across resistors 33 and 34 is in phase with this reference voltage, the potentiometer 37 may be considered as being connected in parallel with the resistors 33 and 34. If the movable arm 36 of potentiometer 37 is adjusted to its grounded end, the voltmeter 35 reads only the alternating voltage output of the variable transconductance amplifier as developed across resistors 33 and 34. By varying the position of arm 36 of potentiometer 37, a voltage point can be reached thereon which is equal in phase and magnitude to the voltage developed across resistors 33 and 34. Since the voltmeter 35 is connected between these two points an amount of alternating voltage can be introduced to permit the reading of voltmeter 35 to be zeroed at any particular thickness setting from which deviations are desired to be measured.

It will be appreciated that my invention may be aligned in different ways to fit various modes of operation. If it is desired to measure directly the thickness of materials with reference to zero thickness, the intercepting material 9 is removed, the arm 36 of potentiometer 37 is moved to its grounded position, and the value of resistor 34 is adjusted until the indicator of meter 35 is fully deflected. When a material 9 to be measured is thereafter interposed between the radioactive source 1 and the ionization chamber 5, the signal level is reduced, the direct current operating point of tube 26 is decreased and causes a corresponding decrease of the voltmeter reading. It is apparent that the meter 35 may then be calibrated to read thickness directly.

If it is desired to measure the deviations in the thickness of an interposed material from a particular zero setting, it is only necessary to adjust the potentiometer 37 until the desired level is reached.

Extreme accuracy of measurement can be obtained by employing sufficient amplifier gain and by proper adjustment of the degeneration introduced by the feedback connection from the voltage dividing resistors 33, 34 to the electrometer amplifier 12. Since the degeneration encompasses the entire amplification system, and the meter 35 is connected to read this degenerated output, any change in amplification is minimized in direct proportion to the amount of degeneration introduced. Therefore, for optimum results, the magnitudes of resistors 33 and 34 are chosen so that a very large percentage of the signal voltage developed across resistor 7 is degeneratively fed back from the output of the variable transconductance amplifier.

Because of the introduction of a reference voltage in the variable transconductance amplifier which is in frequency synchronism with the signal voltage, and because of the conversion of the alternating signal voltage into a unidirectional biasing voltage for the variable amplifier, it is apparent that any phase shift of the signal voltage which may result from many stages of amplification does not affect the feedback signal. Since the feedback voltage is always 180° out of phase with the signal voltage, there is no instability due to possible phase reversal as in the conventional multistage amplification systems, and consequently the amplification may be increased to any desired extent.

It is to be understood that although I have shown a particular embodiment of my invention, I do not wish to be limited thereto, since many modifications may be made; and I intend by the appended claims to cover all such modifications as fall within the true spirit and scope of my invention.

What I claim as new and desire to secure by Letters Patent of the United States is:

1. In a thickness gauge employing as its measuring agent a constant beam of subatomic particles impinging upon a detector thereof and having means to modulate periodically the particle density of said beam to produce an alternating signal voltage output from said detector, alternating current amplification means to amplify said alternating signal voltage, means to convert said amplified signal voltage into a representative unidirectional voltage, means synchronized with said modulating means to provide a substantially constant alternating voltage 180° out-of-phase with said output voltage of said detector, means to vary the magnitude of said out-of-phase voltage responsive to variations in said unidirectional voltage, a fraction of said out-of-phase voltage of varying magnitude being supplied back to the input of said alternating current amplification means, and means to indicate the magnitude of said varying out-of-phase voltage.

2. In a thickness gauge employing as its measuring agent a constant beam of subatomic particles impinging upon a suitable detector thereof and having means to modulate periodically the particle density of said beam to produce an alternating signal voltage from said detector, means including an alternating current amplification system to amplify said signal voltage, means synchronized to said modulating means to provide an alternating voltage of substantially constant amplitude 180° out-of-phase with said signal voltage, said out-of-phase voltage being connected to and cooperating with a phase sensitive detector to convert said amplified signal voltage into a representative unidirectional voltage, means including a variable transconductance amplifier to vary the magnitude of said out-of-phase voltage responsive to variations in said uni-directional voltage, a fraction of said varying out-of-phase voltage being degeneratively fed back to the input of said alternating current amplification system, and means including a meter connected to the output of said variable amplifier to indicate a voltage proportional to said feedback voltage.

3. In a thickness gauge employing as its measuring agent a constant beam of subatomic particles impinging upon a suitable detector thereof and having a rotating shutter arranged to interrupt and to modulate periodically the particle density of said beam to produce an alternating signal voltage from said detector, alternating current amplification means to amplify said signal voltage, means to minimize errors of measurement introduced by said amplification means comprising an alternator synchronized to said shutter and producing a substantially constant alternating voltage 180° out-of-phase with said detector output voltage, a phase sensitive detector connected to receive said amplified signal voltage and cooperating with said alternator output voltage to produce a uni-directional voltage proportional to the magnitude of said amplified signal voltage, and a variable transconductance amplifier having its input circuit connected both to said unidirectional voltage and said alternator output voltage to produce an alternating voltage 180° out-of-phase with said detector output voltage which varies in accordance with said unidirectional voltage, said alternating current amplification means having its input connected to receive the algebraic sum of said detector output voltage and a fraction of said varying out-of-phase voltage.

4. In a thickness gauge employing as its measuring agent a constant beam of subatomic particles impinging upon a suitable detector thereof and having a rotating shutter arranged to interrupt and to modulate periodically the particle density of said beam to produce an alternating signal voltage from said detector, an alternating current amplification system to amplify said signal voltage, means to minimize errors of measurement due to variations in the gain of said amplification system comprising an alternator synchronized to said shutter and producing an alternating voltage 180° out-of-phase with said detector output voltage, a phase sensitive detector connected to receive said amplified signal voltage and cooperating with said alternator output voltage to produce a unidirectional voltage proportional to the magnitude of said amplified signal voltage, a variable transconductance amplifier having its input circuit connected both to said unidirectional voltage and said alternator output voltage to produce in its output circuit an alternating voltage 180° out-of-phase with said detector output voltage and which varies in accordance with said unidirectional voltage, a determinable fraction of said varying out-of-phase voltage being supplied back to the input of said alternating current amplification system to degenerate the output thereof, and an alternating current voltmeter connected across the output of said variable transconductance amplifier to indicate a voltage proportional to said degenerated output voltage.

STANLEY BERNSTEIN.

No references cited.